(12) United States Patent
Kim

(10) Patent No.: US 7,642,473 B2
(45) Date of Patent: Jan. 5, 2010

(54) EXPLOSION CONTAINMENT VESSEL

(75) Inventor: Yong C. Kim, Glendale, CA (US)

(73) Assignee: Barksdale, Inc., Los Angeles, CA (US)

( * ) Notice: Subject to any disclaimer, the term of this patent is extended or adjusted under 35 U.S.C. 154(b) by 230 days.

(21) Appl. No.: 11/900,842

(22) Filed: Sep. 13, 2007

(65) Prior Publication Data

US 2009/0071712 A1   Mar. 19, 2009

(51) Int. Cl.
*H02G 3/06* (2006.01)

(52) U.S. Cl. ............... 174/653; 174/655; 174/135; 174/262; 439/583; 361/809; 248/56

(58) Field of Classification Search ......... 174/653, 174/655–658, 135, 262; 439/583, 584, 462, 439/581; 361/809; 248/56
See application file for complete search history.

(56) References Cited

U.S. PATENT DOCUMENTS

| | | | | |
|---|---|---|---|---|
| 4,525,000 A | * | 6/1985 | Bachle | 285/148.23 |
| 5,763,833 A | * | 6/1998 | Bawa et al. | 174/655 |
| 6,232,554 B1 | * | 5/2001 | Yamazaki et al. | 174/653 |
| 6,403,884 B1 | * | 6/2002 | Lange | 174/653 |
| 7,183,486 B2 | * | 2/2007 | Pyron et al. | 174/59 |

* cited by examiner

*Primary Examiner*—Dhiru R Patel
(74) *Attorney, Agent, or Firm*—Leon D. Rosen

(57)    ABSTRACT

An enclosure (10) that contains a switch (40, 42) and that is surrounded by an explosive or flammable environment that could be ignited by a spark from the switch, includes a body (52) that guides a flat cable (16) through a body bore (56) to the inside of the vessel. A tight and strong seal is formed around the flat cable by a tubular seal (60) that lies in the body bore, that is formed of Teflon, and that has a tapered seal section (84) that lies in a tapered section (74) of the bore. A nut (62) at the rear of the body can be turned to push the tubular seal forward within the body bore and thereby compress it against the outside of the flat cable to form an explosion-proof seal.

10 Claims, 3 Drawing Sheets

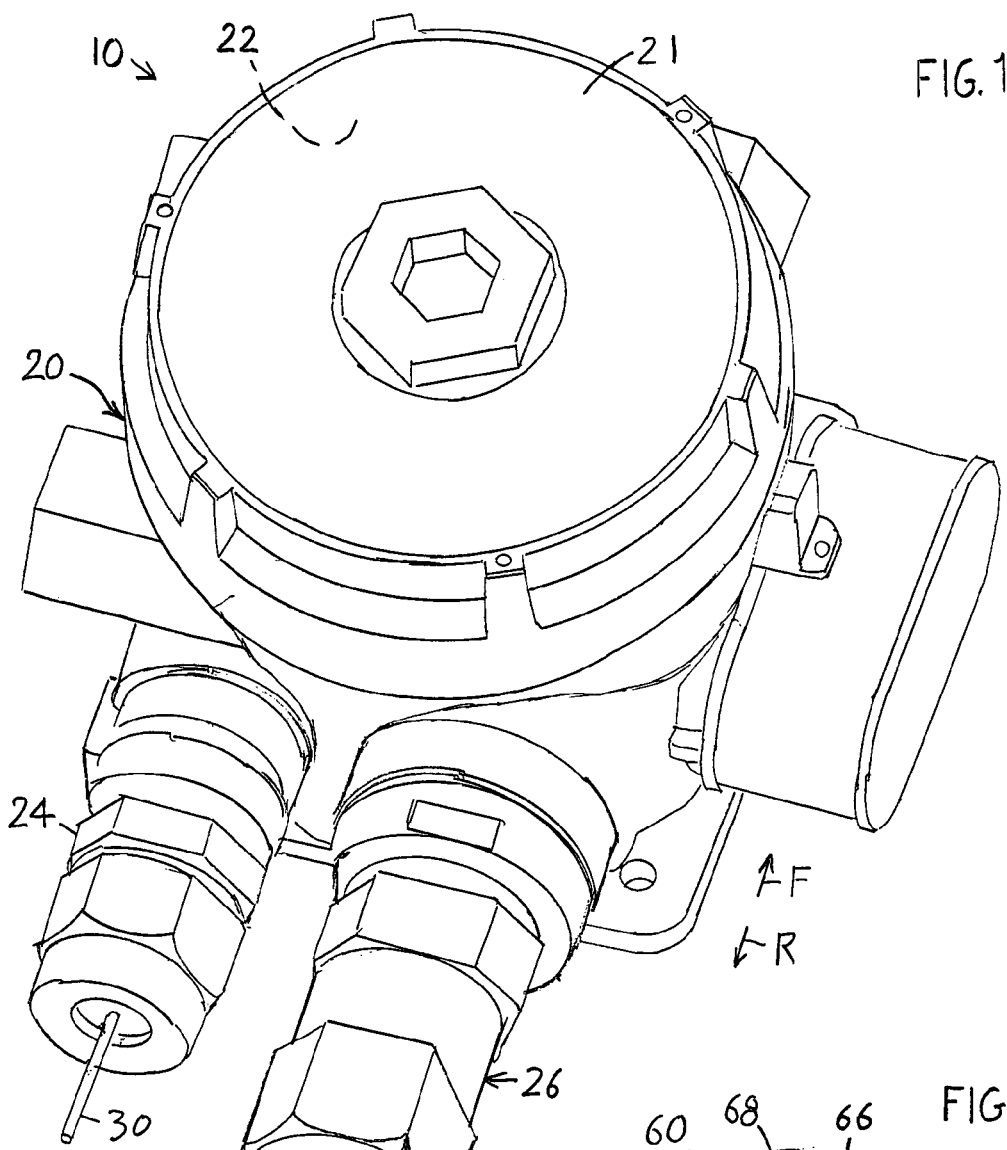
FIG. 1
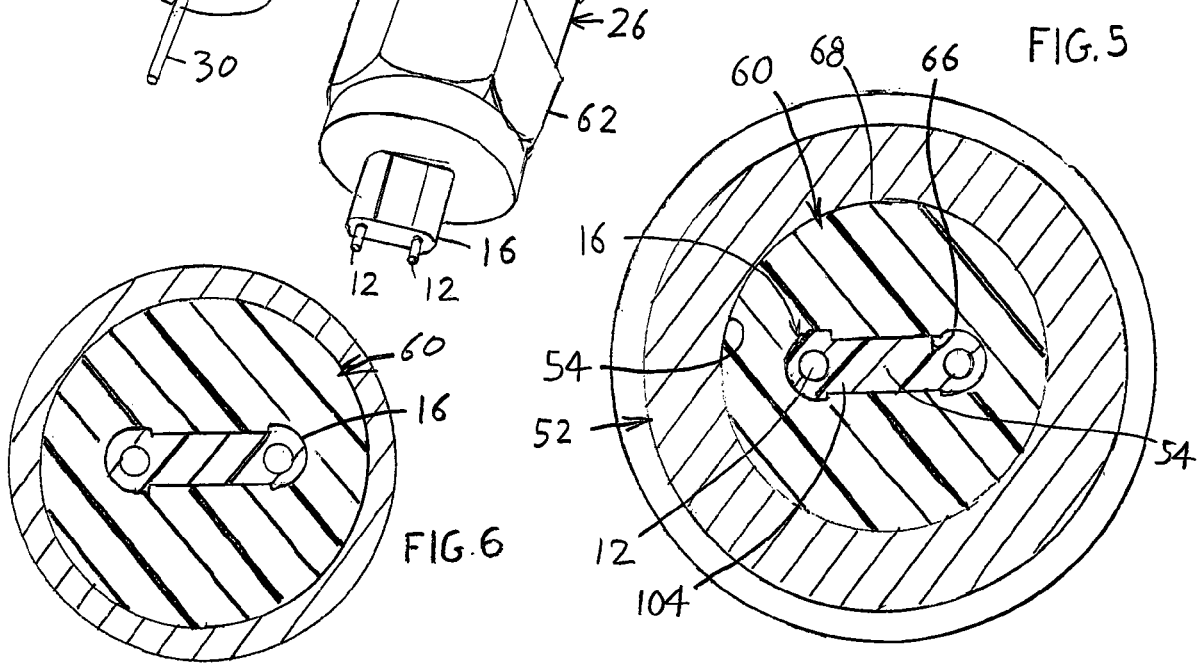
FIG. 5
FIG. 6

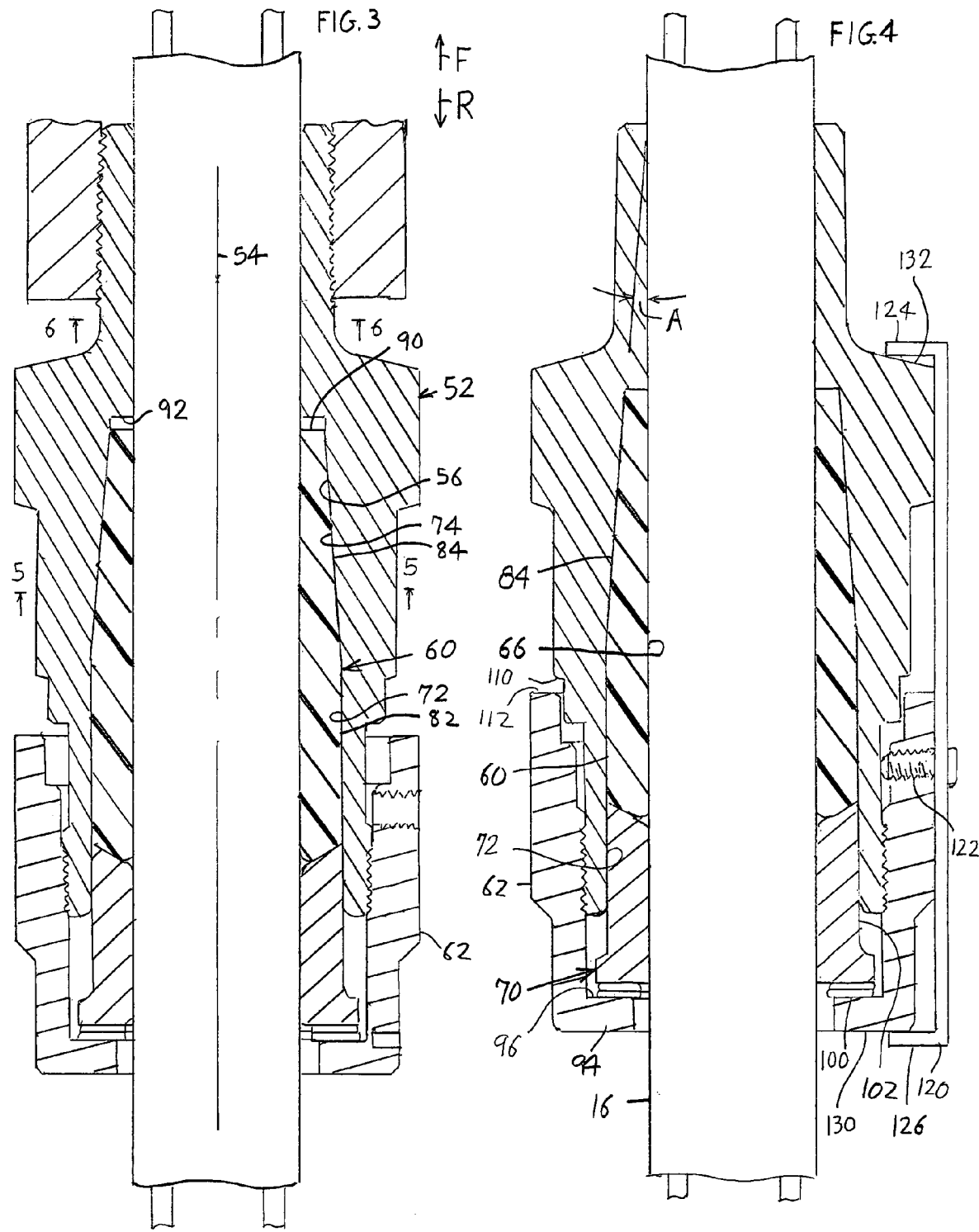

EXPLOSION CONTAINMENT VESSEL

BACKGROUND OF THE INVENTION

Industrial plants that process volatile (explosive or flammable) chemicals such as gaseous hydrocarbons, often maintain the chemicals at a predetermined temperature by heating them with currents passing through a flat self-regulating heating cable. A pipe carries fluid at the same temperature as the chemicals being processed, to an explosion containment vessel that contains one or more switches that are closed and opened according to the temperature of fluid in the tube. This gives rise to the danger that when switches operate, they can create sparks that may ignite chemicals in the environment. Sometimes the containment vessel is opened for maintenance etc. and the volatile environment drifts into the explosion containment vessel, where it can ignite when the next spark is generated. The purpose of the containment vessel is to prevent the flame or explosion that occurs inside the vessel, from passing out of the vessel into the volatile environment.

One prior system for forming an explosion-proof seal around the flat cable that carries current between a switch(es) in the vessel and a heater outside the vessel, guided the flat cable through a bore in a body. After the cable was in place, the bore was filled by flowing a flowable inert potting compound such as epoxy into the bore and letting the potting compound set. It could take two days to seal the flat cable in place with such system, which can hold up other projects.

A system for providing a tight seal around a flat cable that extends through a body into an explosion proof vessel, which could be set up in a short period of time, would be of value.

SUMMARY OF THE INVENTION

In accordance with one embodiment of the present invention, a system is provided that creates an explosion and flame proof seal between a flat cable of rectangular cross-section and a body bore section of circular cross-sections that guides the cable into an explosion-proof chamber where the cable connects to a switch(es). The system includes a tubular seal of a polymer material such as TEFLON, which deforms under pressure, and that lies closely within the bore section. The seal is molded with a largely rectangular passage that closely receives the flat cable, and the outside of the seal fits closely within the body bore. When a nut at the rear of the body is turned, it forwardly advances a coupling assembly that pushes the tubular seal forwardly deeper into the body bore. The body bore is constructed to limit forward movement of the seal front end, so the seal is compressed and expands tightly against the bore walls and against the flat cable to make explosion and flame-proof seals against them.

The bore section that the tubular seal seals to, and the corresponding seal section that lies therein, are tapered to be of progressively smaller diameters at progressively more forward locations therealong. As a result, when the tubular seal is pressed forward deeper into the tapered bore section, the seal is compressed and its material seals tightly to the bore walls and to the cable. The tapered end of the bore has a stop that limits forward movement of the front end of the tubular seal. When the seal abuts the stop, further turning of the nut causes further expansion of the seal.

The novel features of the invention are set forth with particularity in the appended claims. The invention will be best understood from the following description when read in conjunction with the accompanying drawings.

BRIEF DESCRIPTION OF THE DRAWINGS

FIG. 1 is a front and top isometric view of an explosion containment vessel of the invention.

FIG. 3 is a sectional view of the body and associated parts of the vessel of FIG. 2, before the nut at the rear of the body has been tightened.

FIG. 4 is a view similar to that of FIG. 3, after the nut has been tightened.

FIG. 5 is a sectional view taken on line 5-5 of FIG. 3.

FIG. 6 is a sectional view taken on line 6-6 of FIG. 3.

DESCRIPTION OF THE PREFERRED EMBODIMENTS

Figure 2:
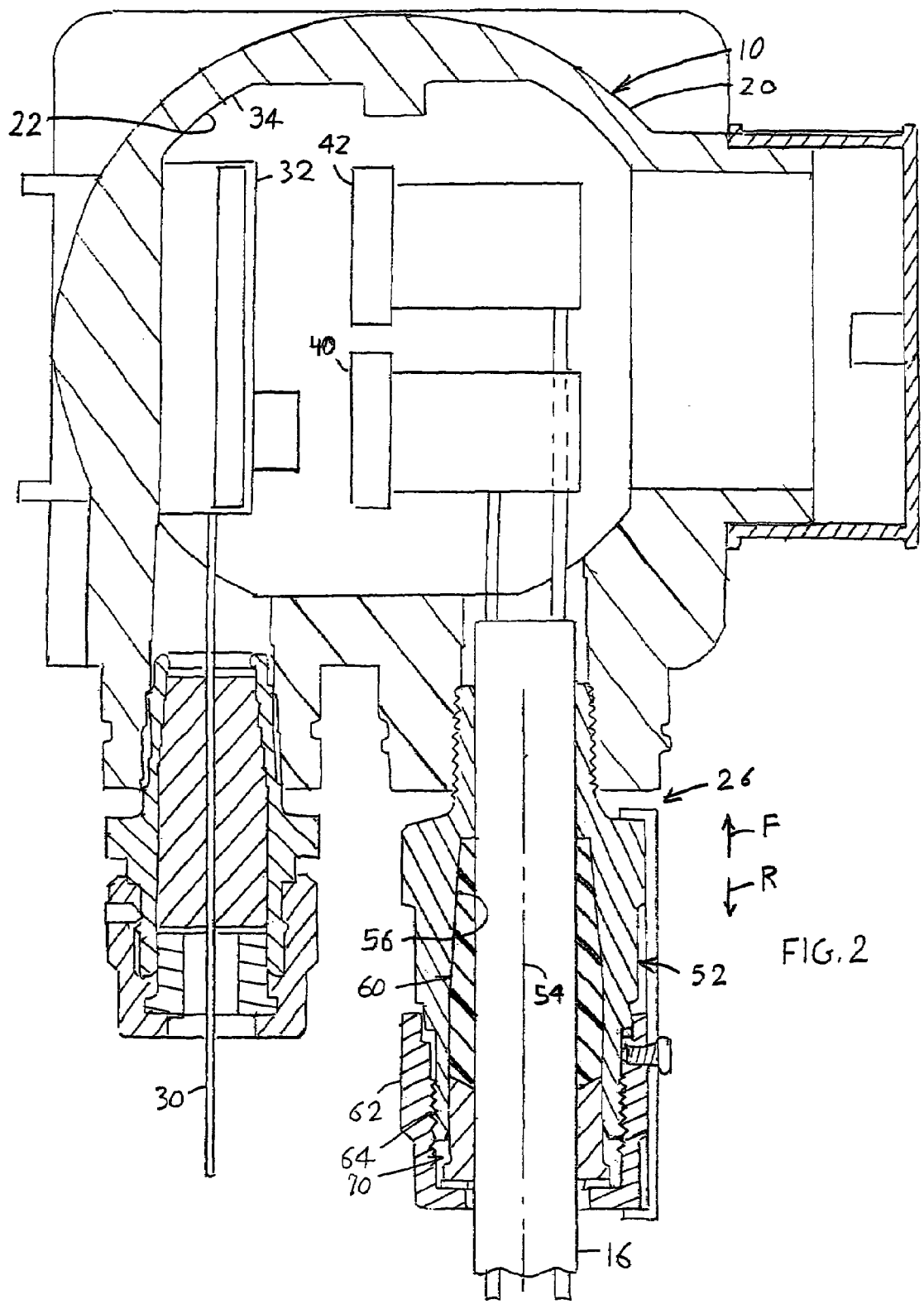
FIG. 2 is a sectional top view of the vessel of FIG. 1.

FIG. 1 shows an explosion proof containment vessel 10 that holds switches that control the flow of electrical current through conductors 12 of a flat cable 16. The cable 16 extends to an electrically energized heater (not shown) to energize it to heat chemicals when their temperature reaches the lower end of a desired range of temperatures and to stop energizing the heater when the temperature reaches the higher end of the range. The vessel includes a housing 20 with a cover 21 and a cavity 22, and a pair of projections 24, 26 that project rearward R from the housing. The cable-guiding projection 26 surrounds the flat cable 16. The tube-guiding projection 24 surrounds a tube 30 that carries a fluid that is at about the same temperature as the chemicals whose temperature is to be maintained within the desired range.

FIG. 2 shows that walls 34 that form the cavity 22 in the vessel encloses a temperature-sensing actuator 32 and a pair of switches 40, 42 that are operated by the actuator so the switches are operated at the preset temperatures. Usually this involves closing the switches when the temperature of fluid in tube 30 falls to the lower end of the range and opening the switches when the fluid temperature reaches the higher end of the range. A dial (not shown) can be turned to adjust the temperature range.

The vessel 10 is intended to be used in an environment that contains volatile (explosive and/or flammable) chemicals such as gaseous hydrocarbons being processed. If a person opens the cover 21 and closes it, some of the volatile chemicals may drift into the vessel chamber and create an explosive and/or flammable environment in the vessel. If the switch then creates a spark, the chemicals in the vessel may explode or create a flame. The present invention provides a seal that is tight and strong enough to prevent any such explosion or flame from passing rearwardly R through the cable-passing projection 26 into the volatile environment surrounding the vessel 10 and producing a large explosion or fire in the environment.

The fluid-carrying tube 30 is of cylindrical outside shape, and therefore is easy to seal to. The flat cable 16 is of largely rectangular cross-section, and therefore is difficult to seal to in a manner that provides a tight and strong seal that resists destruction from an explosion or flame that occurs within the vessel chamber. The present invention provides such a tight and strong seal to the outside of a flat cable, which is a cable that has parallel and closely spaced top and bottom surfaces, in a manner that allows the sealing to be conducted rapidly and at low cost.

The projection 26 that guides the flat cable 16 into the cavity 22 includes a portion that applicant refers to as a body 52 that extends along a body axis 54. The body 52 can be integral with the rest of the protrusion 26, which is integral with the housing 20 that forms the cavity 22. However, the body 52 can instead be a separate part as shown in FIG. 2. The body 52 (which is part of the housing or a separate part) has a bore 56 that holds a tubular seal 60 that is formed of a polymer material such as a fluorocarbon (e.g. TEFLON) that deforms under high pressure, e.g. pressure of at least 100 psi, that can be applied by turning a nut. A threaded rear member 62 in the form of a nut which is threadably connected to the body rear portion 64, can be turned to advance a pressure coupling 70 to press the tubular seal 60 in a forward F direction.

FIGS. 3 and 4 show details of the body 52 and of the parts that seal the tubular seal 60 to the walls of the body bore 56. FIG. 3 shows the body before the nut 62 has been tightened on the body, while FIG. 4 shows the nut 62 after it has been tightened to form a tight and strong seal. FIG. 5 shows that the tubular seal 60 has a rectangular passage 66 that closely receives the flat cable 16 and that has an exterior surface 68 of round cross-section that is closely received in the bore 54 of the body. The tubular seal 60 is preferably molded to form the largely rectangular passage.

FIG. 3 shows that the body bore has a cylindrical rear bore section 72 and a tapered, or conical, front bore section 74, and that the tubular seal 60 has a cylindrical rear seal section 82 and tapered front seal section 84. Both the body bore and the outside of the tubular seal are centered on the body axis 54. When the tubular seal has been pressed forward with a moderate force (e.g. 10 pounds) into the bore, its cylindrical and tapered rear and front seal sections 82, 84 fit closely in the corresponding cylindrical and tapered rear and front bore sections 72, 74. By "closely", applicant is referring to gaps of an average of no more than about 0.05 inch between the seal and the body bore, with a slight interference fit acceptable because the seal material can deform. It can be seen from FIG. 3 that the front end 90 of the tubular seal is spaced rearward of an abutment 92.

FIG. 4 shows the body after the nut 62 has been turned with considerable torque to advance forwardly F to a fully forward position. The nut has a radially inward flange 94 with a forwardly-facing shoulder 96 that presses forwardly against the pressure coupling 70. The pressure coupling 70 includes a pair of simple flat washer 100 and also includes a long washer 102 that fits closely in the rear of the body rear cylindrical bore section 72. The long washer 102 is long (a length at least one-half its radius) so it is prevented from tilting by lying in a length of the bore rear section. When the nut is tightened, the long washer presses forwardly against the tubular seal 60, thereby forcing the seal forwardly along the bore. Since the tapered front seal section 84 of the tubular seal is forced into a progressively narrowing bore, but cannot escape, the material of the seal is forced into gaps between the outside of the seal and the walls of the bore, and into gaps between the inside passage 66 of the seal and the flat cable 16. Some of the displacement of the seal material results in compressing the polymer insulation 104 (FIG. 5) of the flat cable that surrounds its conductors. The displacement of the seal material assures that all gaps, such as any gap at the rounded opposite sides of the flat cable are sealed. Applicant prefers that the tapered front sections 84, 74 of the seal and of the bore, have a tapered angle A of between 2° and 10° from said body axis. A smaller taper angle A requires more turning of the nut. While a larger taper angle A results in more torque to turn the nut. The particular angle is 5°.

If the nut 62 (FIG. 3) is tightened so much that the front end 90 of the tubular seal engages the abutment 92, then further tightening of the nut will force further seal material into any gaps. It would be possible to rely on the engagement of the seal front end 90 with the abutment to force seal material into any gaps. However, the displacement of material is much more even along the length of the tapered seal section by pushing a tapered front seal section 84 of the seal into a tapered front bore section 74 of the bore. The amount of nut tightening is limited by a shoulder 110 on the body that engages a stop 112 on the nut.

FIG. 4 shows a bracket 120 that has been mounted on the nut 62 after the nut has been tightened. The bracket is held in place by a screw 122 that also serves as a set screw that prevents loosening of the nut. The bracket has opposite ends 124, 126 that can be put in place between a forward-facing nut surface 130 and a rearward-facing body surface 132, only if the nut has been tightened sufficiently to assure a sufficiently tight and strong seal.

Thus, the invention provides an easily and rapidly installed seal for sealing a flat cable of largely rectangular cross section to walls of a body bore with round cross sections, to provide a tight and strong sealing that prevents an explosion or fire in a vessel cavity from passing out of the vessel and igniting volatile material in the area around the vessel. A seal is used that is formed of a moldable polymer that deforms under high pressure. A threaded member at the rear of the body can be turned to forwardly advance a pressure coupling that presses the seal forward in the body bore to compress the seal and cause it to be displaced into gaps around the flat cable and between the seal outer surface and the bore inner surface. The bore and seal preferably have tapered sections, and the seal is compressed as it is forced forward into a progressively smaller tapered portion of the bore.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An explosion containment vessel which includes walls (34) forming a cavity, a switch in said cavity which can create a spark that sets off an explosion, a body that projects rearwardly from said cavity, said body having an axis and having a bore extending along said axis and having a threaded body rear portion (64), and a flat cable that projects through said body bore and that has at least one cable conductor that connects to said switch, wherein said flat cable is of non-circular cross-section, wherein:

said body bore has a tapered section that is of progressively smaller diameter at progressively more forward locations; and including a tubular seal of a polymer material that deforms under high pressure, said tubular seal having a tapered seal section lying closely in said body bore tapered section and having a seal passage section that closely receives said flat cable;

a threaded rear member (62) that is threadably connected to said body rear portion and that has a forwardly-facing shoulder, and a pressure coupling (70) that lies between said shoulder and a rear end of said tubular seal, so when said threaded rear member is turned to forwardly advance its shoulder, the pressure coupling presses the tapered seal section (84) forwardly to radially inwardly compress the tubular seal and tightly seal it to said flat cable and to walls of said body bore.

2. The vessel described in claim 1 including:

a bracket (120) mounted on said threaded rear member and having opposite ends (124, 126) engaged respectively with a forward-facing surface of said threaded rear member and with a rearward-facing surface of said body, to indicate that the threaded rear member has been tightened.

3. The vessel described in claim 1 wherein:

said body forms an abutment at a front end of said body bore tapered section that stops forward movement of the tubular seal to cause material of said tubular seal to expand tightly around said flat cable as said threaded rear member is screwed forward.

4. The vessel described in claim 1 wherein:

said pressure coupling includes a long washer that has a slot through which said flat cable extends, said long washer with a length more than twenty percent of its average outside radius, said long washer fits closely within said body bore, so when the threaded rear member is turned, a front end of the long washer presses forwardly against a rear end of the tubular seal.

5. The vessel described in claim 1 wherein:

said tubular seal has a cylindrical rear section extending rearward of said seal tapered section, and said bore of said body has a cylindrical rear section that closely receives said seal cylindrical rear section.

6. A vessel described in claim 1, wherein:

said body tapered portion and said tapered seal portion, each has an outside surface that is inclined between two degrees and ten degrees from said body axis.

7. The vessel described in claim 1, wherein:

said tubular seal polymer material is a fluorocarbon.

8. An explosion containment vessel which includes walls forming a cavity, a switch in said cavity which can create a spark that sets off an explosion, a body that projects rearwardly away from said cavity, said body having an axis and having a bore extending along said axis and having a threaded body rear portion and including a flat cable that projects through said body bore and that has a pair of cable conductors connected to said switch, including:

a tubular seal of a polymer material that deforms under high pressure and that lies closely in a section of said rear body bore, said tubular seal having a seal passage that closely receives said flat cable;

a threaded rear member that is threadably connected to said threaded body rear portion and that has a forwardly-facing shoulder, and a pressure coupling that lies between said shoulder and a rear end of said tubular seal, so when said threaded rear member is turned to forwardly advance its shoulder the pressure coupling presses the tubular seal forwardly;

said body bore forms an abutment at a front end of said body bore section that stops forward movement of the tubular seal and that causes material of said tubular seal to expand tightly around said flat cable as said threaded rear member is turned to advance forward after the tubular seal abuts said abutment.

9. The vessel described in claim 8 wherein:

said body bore includes a tapered forward section that is tapered to be of progressively smaller diameter at progressively more forward locations therealong, and said tubular seal has a correspondingly tapered forward section that fits closely in said bore tapered forward section.

10. The vessel described in claim 8 wherein:

said body tapered section and said tapered seal forward section, each has an outside surface that is inclined between two degrees and ten degrees from said body axis.

\* \* \* \* \*